US011244065B2

(12) United States Patent
Poothokaran et al.

(10) Patent No.: US 11,244,065 B2
(45) Date of Patent: Feb. 8, 2022

(54) APPLICATION MONITORING AND DEVICE RESTRICTION SYSTEM AND METHOD

(71) Applicant: Avast Software s.r.o., Prague (CZ)

(72) Inventors: John Poothokaran, Palo Alto, CA (US); Juyong Do, Cupertino, CA (US); Rajarshi Gupta, Los Altos, CA (US)

(73) Assignee: Smith Micro Software, Inc., Pittsburgh, PA (US)

( * ) Notice: Subject to any disclaimer, the term of this patent is extended or adjusted under 35 U.S.C. 154(b) by 371 days.

(21) Appl. No.: 16/519,556

(22) Filed: Jul. 23, 2019

(65) Prior Publication Data

US 2021/0026978 A1 Jan. 28, 2021

(51) Int. Cl.
*G06F 15/16* (2006.01)
*G06F 21/62* (2013.01)
*G06N 20/00* (2019.01)
*H04L 29/08* (2006.01)

(52) U.S. Cl.
CPC ......... *G06F 21/6218* (2013.01); *G06N 20/00* (2019.01); *H04L 67/22* (2013.01)

(58) Field of Classification Search
CPC ............................. H04L 67/22; G06F 21/6218
USPC ............................................................ 726/27
See application file for complete search history.

(56) References Cited

U.S. PATENT DOCUMENTS 8,490,176 B2 * 7/2013 Book .................... G06F 21/305 726/17
10,915,369 B2 * 2/2021 Wang ...................... H04L 47/78
2010/0169910 A1 7/2010 Collins et al.
2011/0065419 A1 * 3/2011 Book .................. G06F 21/6218 455/411
2013/0150004 A1 6/2013 Rosen
2014/0344861 A1 11/2014 Berner et al.
2014/0349270 A1 * 11/2014 Kapoor .................... G09B 5/06 434/350
2015/0007307 A1 * 1/2015 Grimes ................ H04W 4/023 726/18
2017/0041454 A1 2/2017 Nicholls et al.
(Continued)

OTHER PUBLICATIONS

International Search Report dated Oct. 18, 2019 for PCT/US 2019052445.

(Continued)

*Primary Examiner* — Moustafa M Meky
(74) *Attorney, Agent, or Firm* — Dovas Law, P.C.

(57) ABSTRACT

A method of controlling use of network-connectable devices is provided. First network requests from a first user device executing a first operating system are monitored, and applications operating in the foreground on the first user device during the first network requests are monitored. A model is trained based on the first network requests and based on the applications respectively operating in the foreground on the first user device during the first network requests. Second network requests from a second user device executing a second operating system are monitored, and the model is applied to the second network requests from the second user device to determine a particular application operating in the foreground on the second user device. A function of the second user device is restricted based on the determining of the particular application operating in the foreground on the second user device.

23 Claims, 11 Drawing Sheets

(56) References Cited

U.S. PATENT DOCUMENTS

| | | | | |
|---|---|---|---|---|
| 2017/0277796 | A1 | 9/2017 | Kim | |
| 2019/0050710 | A1 | 2/2019 | Wang et al. | |
| 2019/0228669 | A1* | 7/2019 | Baym | G09B 5/02 |

OTHER PUBLICATIONS

ParallelDot World Class AI Solutions at your fingertips, Breakthrough Research Papers and Models for Sentiment Analysis, https://blog.paralleldots.com/data-science/breakthrough-research-papers-and-models-for-sentiment-analysis/, accessed Apr. 23, 2019.

Jiwei Li, Minh-Thang Luong and Dan Jurafsky, 2015. A Hierarchical Neural Autoencoder for Paragraphs and Documents, arXiv:1506.01057v2.

Siwei Lai, Liheng Xu, Kang Liu, Jun Zhao, 2015. Recurrent Convolutional Neural Networks for Text Classification, Institute of Automation, Chinese Academy of Sciences, China.

* cited by examiner

APPLICATION MONITORING AND DEVICE RESTRICTION SYSTEM AND METHOD

FIELD OF INVENTION

The invention relates generally to computing device control, and more particularly to restricting computing device use.

BACKGROUND

Parents often endeavor to limit the amount of time their children spend on various network-connectable computing devices including personal computers, tablets, cellular mobile devices, video game consoles, televisions, and electronic media players. Since network-connectable computing devices have become increasingly integral with a user's personal, academic, and vocational life, it is not practical to arbitrarily preclude use of such devices. Monitoring such use is difficult and time consuming, and it is not necessarily practical to look over a child's shoulder while the child is using a computing device for example to determine which applications the child is using. Moreover, the operating system of a child's computing device may not render accessible necessary information regarding which application is actively in use. This frustrates electronic means of determining how much the child is using particular applications, limiting use of such applications, and limiting overall use of the child's computing devices.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method of controlling use of network-connectable devices is provided. The method includes monitoring a first plurality of network requests from one or more first user devices executing a first operating system and monitoring a plurality of applications operating in the foreground on the one or more first user devices respectively during the first plurality of network requests. One or more models are trained based on the first plurality of network requests and the applications operating in the foreground on the one or more first user devices respectively during the first plurality of network requests. A second plurality of network requests from a second user device executing a second operating system are monitored, and the one or more models are applied to the second plurality of network requests from the second user device to determine a particular application operating in the foreground on the second user device. A function of the second user device is restricted at least based on the determining of the particular application operating in the foreground on the second user device.

A further method is provided including monitoring a first plurality of domain name system ("DNS") requests from one or more first user devices executing a first operating system, the first plurality of DNS requests including a first plurality of uniform resource locators ("URLs"). A plurality of applications operating in the foreground on the one or more first user devices respectively are monitored during the first plurality of DNS requests. One or more models are trained based on the first plurality of URLs and the plurality of applications operating in the foreground on the one or more first user devices respectively during the first plurality of DNS requests. A second plurality of DNS requests from a second user device executing a second operating system are monitored, the second plurality of DNS requests comprising a second plurality of URLs. The one or more models are applied to the second plurality of URLs from the second user device to determine a particular application operating in the foreground on the second user device. A function of the second user device is restricted or an alert or a report is transmitted at least based on the determining of the particular application operating in the foreground on the second user device.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

DETAILED DESCRIPTION OF ILLUSTRATIVE EMBODIMENT(S)

Figure 1:
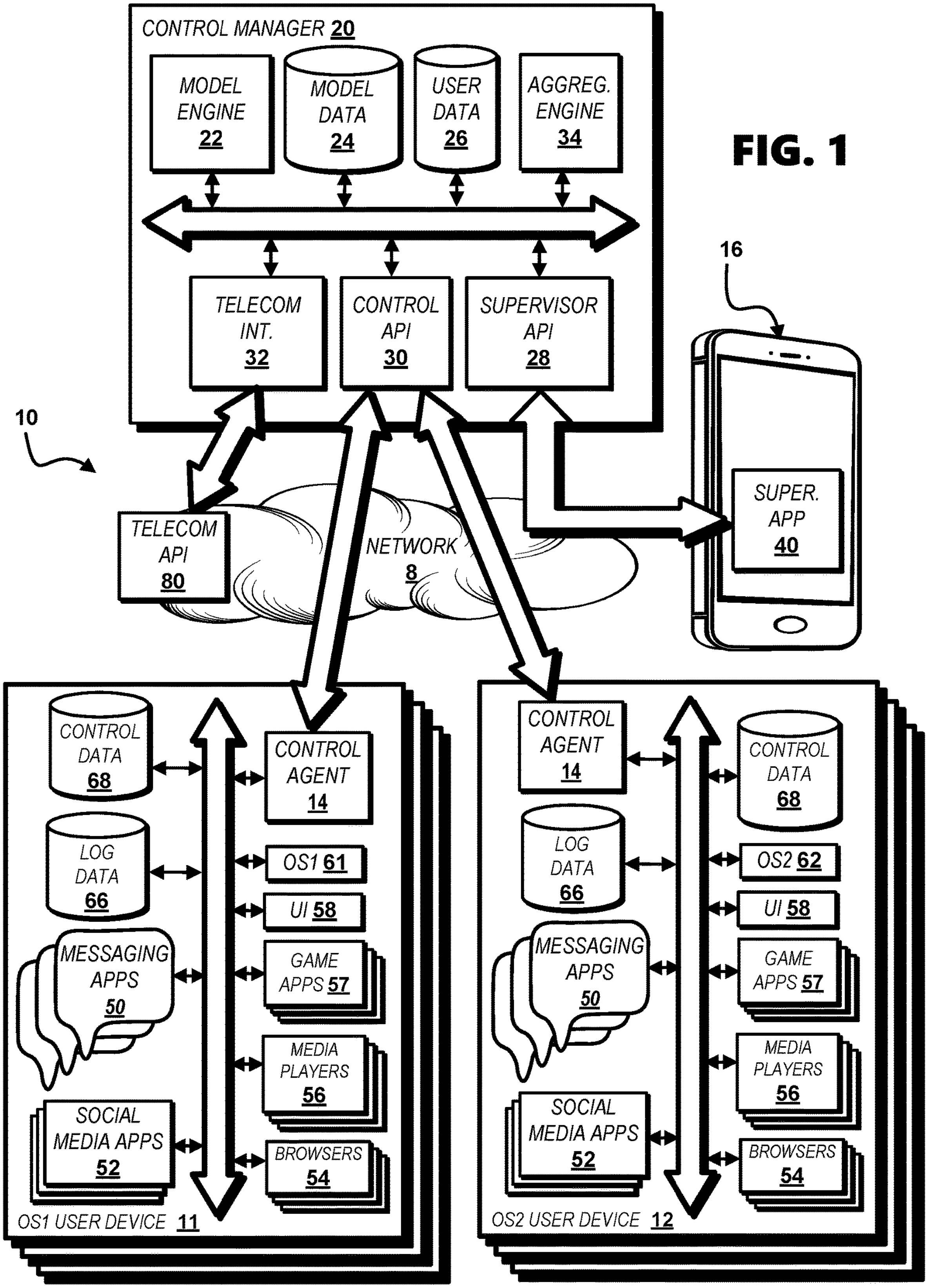
FIG. 1 shows a system enabling control of computing devices according to the illustrative embodiments.
Figure 2A:
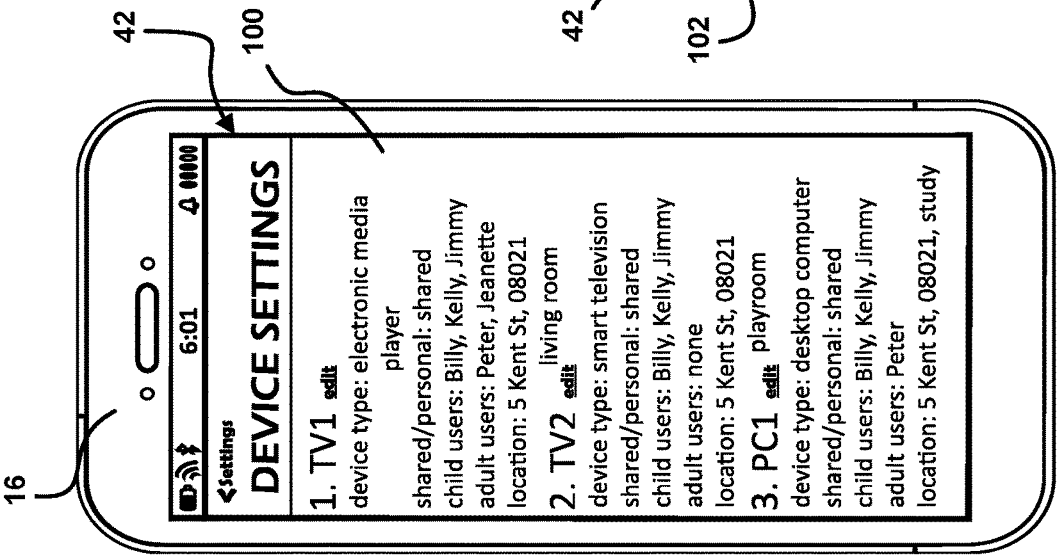
FIGS. 2A-2E show example interactive displays for entering and editing control settings for controlling computing devices.
Figure 2B:
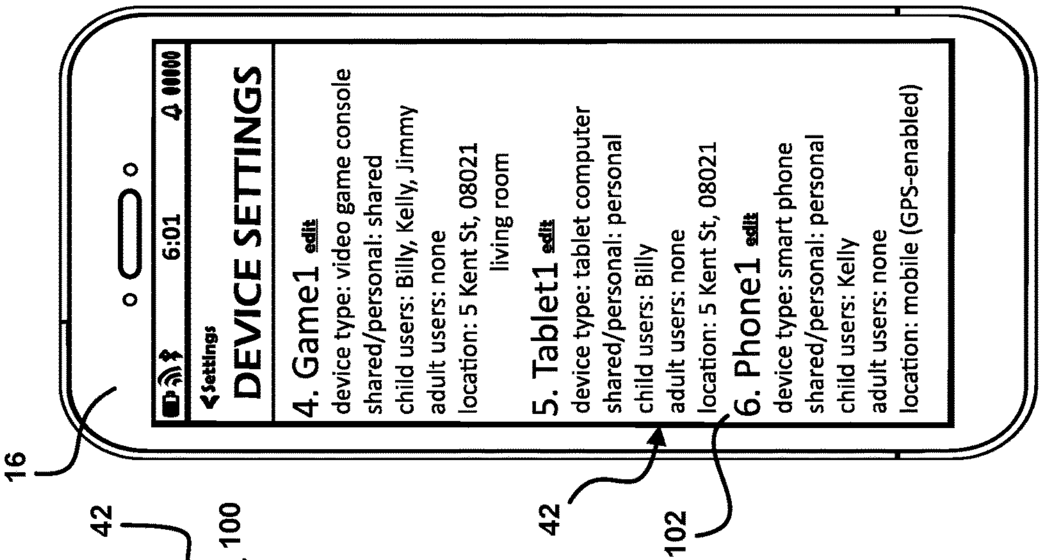
Figure 2C:
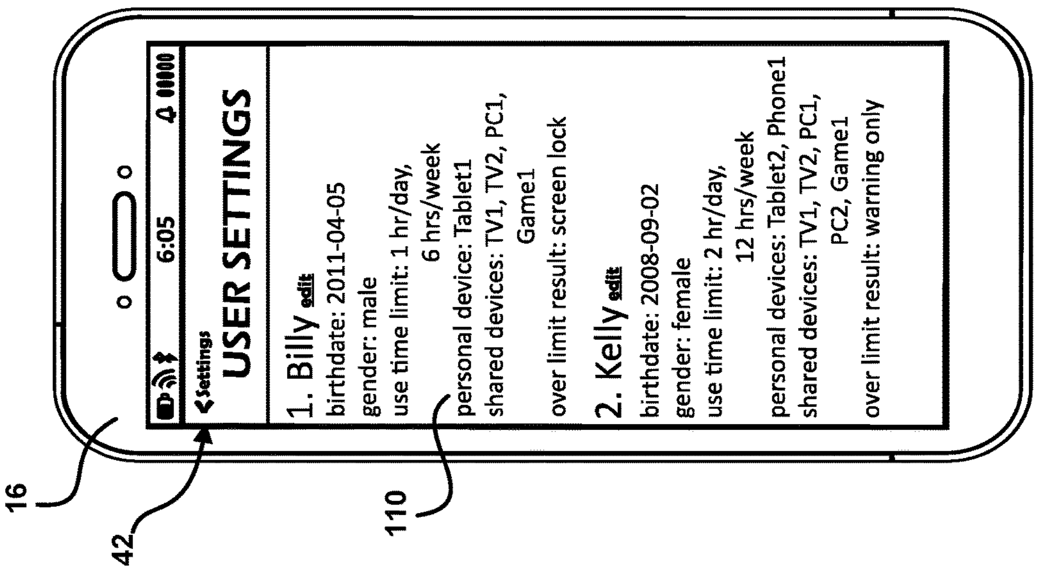
Figure 2D:
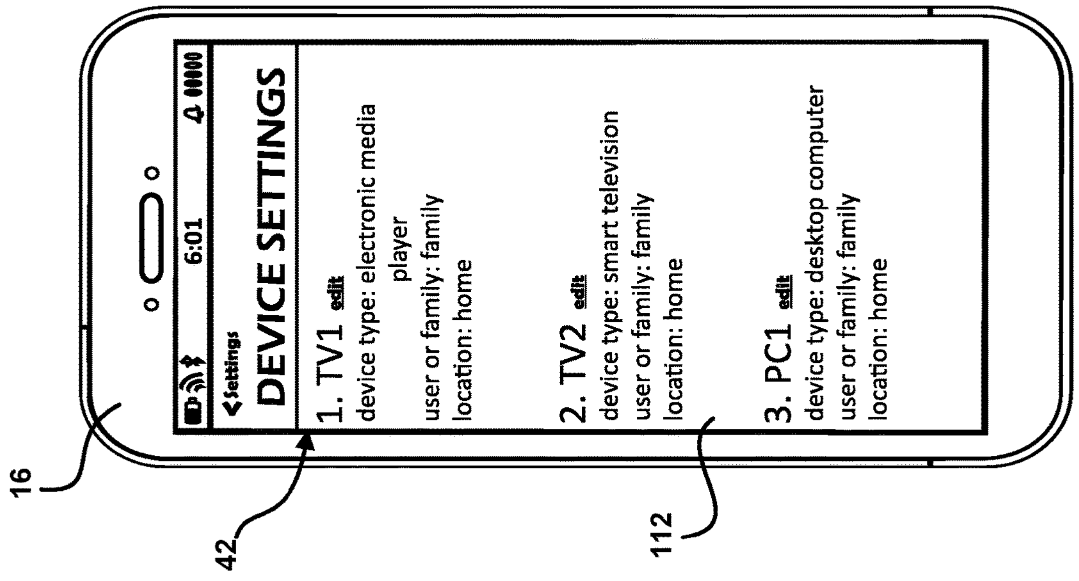
Figure 2E:
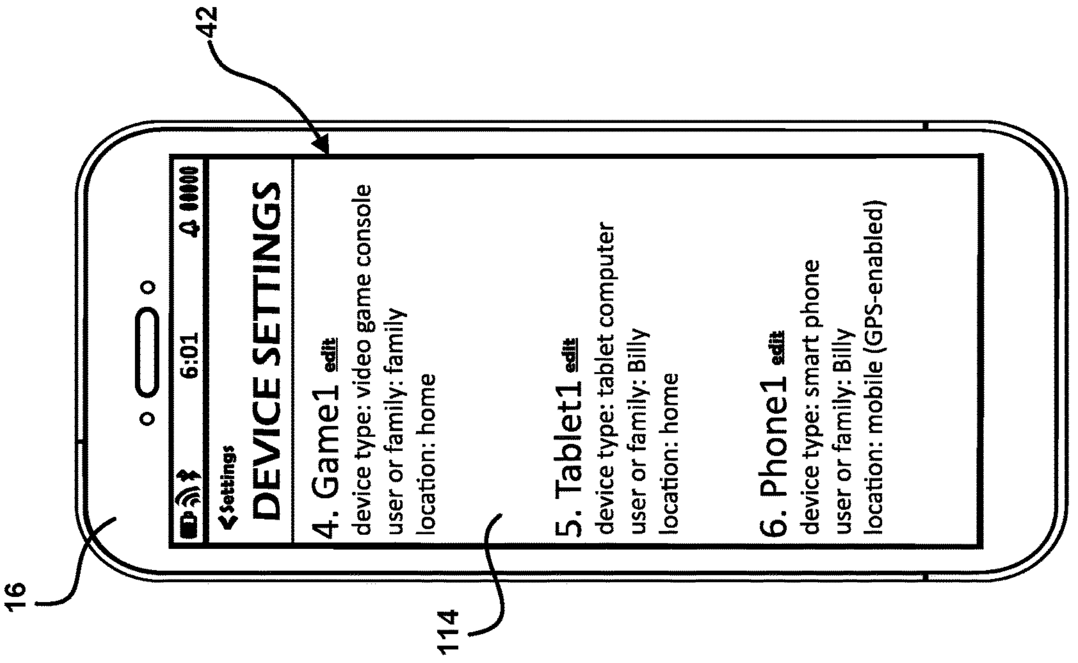

Embodiments of the invention are described below with reference to the drawing figures wherein like numerals represent like elements throughout. The terms "a" and "an" as used herein do not denote a limitation of quantity, but rather denote the presence of at least one of the referenced items.

Referring to FIG. 1, a system 10 for enabling control of computing devices 11, 12 is provided in a communications network 8 including one or more wired or wireless networks or a combination thereof, for example including a local area network (LAN), a wide area network (WAN), the Internet, mobile telephone networks, and wireless data networks such as WiFi™ and 3G/4G/5G cellular networks. A first operating system 61 (hereinafter "OS1 61") is executed on computing devices 11 (hereinafter "OS1 user devices 11") and a second operating system 62 (hereinafter "OS2 62") is executed on computing devices 12 (hereinafter "OS2 user devices 12"). The system 10 permits a supervisory user operating another computing device 16 (hereinafter "supervisor device 16") to set controls for a plurality of user devices 11, 12 operated by a supervised user, for example a child of a parent supervisory user.

Particularly, the system 10 enables identification of an application operating in the foreground on the user devices 11, 12. An application operating in the foreground ("foreground application") as described herein is an application which is the subject of input focus such that user inputs to the user devices 11, 12 are directed to the foreground application. When an application is operating in the foreground on one of the user device 11, 12 typically one or more display elements of the application are active in the user interface 58, which one or more display elements may occupy all or part of a display enabled by the user interface 58.

A supervisory user is enabled to make informed decisions on whether to intervene in a supervised user's electronic activity based on applications which operate in the foreground and the duration of operation of applications which operate in the foreground. The system 10 further enables an adaptive electronic screen time policy for example to block device applications or functional components or to adjust screen time based on usage trends of applications which operate in the foreground. For example, screen time can be minimized or applications blocked based on operating duration of objectionable foreground applications (e.g., gaming applications 57) exceeding a particular threshold. Alternatively, screen time can be maximized or applications enabled based on operating duration of beneficial foreground applications (e.g., academic applications) exceeding a particular threshold.

As described herein, the OS2 62 is an operating system which is not enabled to provide access or hinders access to data indicating which application is operating in the foreground. Without this information the reporting of user device activity and the implementing of activity-based device controls is frustrated. To address this problem, a network-connectable processor-enabled control manager 20 and a control agent 14 are enabled to predict an application operating in the foreground of an OS2 user device 12 based on network requests made by applications on the OS2 user device 12 and other sources of data available on the OS2 user device 12. Based on determined foreground applications, the system 10 via the control manager 20 and control agent 14 on the OS2 user devices 12 institutes device controls and provides alerts and self-correction guides to supervised users and alerts and reports including activity summaries to supervisory users. OS1 61 on the other hand is an operating system which is enabled to provide access to data indicating which application is operating in the foreground. The control agent 14 executed on an OS1 user device 11 can for example access foreground information from a log stored in the log datastore 66.

The user devices 11, 12 and supervisor device 16 operate in the network 8 and can be mobile and located in different geographic areas. The user devices 11, 12 and supervisor device 16 can each include for example a smart phone or other cellular-enabled mobile device configured to operate in a wireless telecommunications network. Alternatively, the user devices 11, 12 and supervisor device 16 can each include a personal computer, tablet device, video game console, television controller, set-top box, digital media player or other computing device. User devices 11, 12 can be assigned to a particular user, as is typical for example with a mobile phone, or shared among more than one user, as is typical with video game consoles, television controllers, and set-top boxes. Data indicating whether a user device 11, 12 is shared or assigned to a particular user can be received from a supervisory user via the supervisor application 40 and stored in the user datastore 26.

A user operates a user device 11 or a user device 12 with a control agent 14 active. Software and/or hardware residing on a user device 11, 12 enables the control agent 14 to monitor and restrict use of the user device 11, 12 and content accessible by the user device 11, 12. Software and/or hardware residing on a user device 11, 12 further enables messaging applications 50, for example Short Message Service ("SMS") messaging applications or applications supporting other messaging protocols, for example via 3G/4G/5G cellular protocols, WiFi™ protocol or TCP/IP through the Internet. A user can implement the messaging applications 50 for example to connect to a message forwarding center, for example via GSM wireless protocol or TCP/IP through the Internet, to communicate with other devices, for example other user devices 11, 12. Social media applications 52, Internet browsers 54, electronic media players 56, gaming applications 57, a user interface 58, and an OS1 61 or OS2 62 are also enabled by software and/or hardware residing on the user device 11, 12.

The control agent 14 can be configured as a standalone application executable by a processor of a user device 11, 12 in communication with the messaging applications 50, social media applications 52, browsers 54, electronic media players 56, gaming applications 57 or other communication facilitating or content providing applications. Alternatively, the control agent 14 can be provided as a processor-implemented add-on application integral with the messaging applications 50, social media applications 52, browsers 54, or other communication facilitating or content providing applications. The control agent 14 is enabled to block applications, electronic communications, and electronic media available to a user of a user device 11, 12 through the messaging applications 50, social media applications 52, browsers 54, electronic media players 56, gaming applications 57, or other communication facilitating or content providing applications. The control agent 14 is further enable to restrict functionality of and disable the user interface 58 via the operating systems 61, 62.

The network-connectable processor-enabled control manager 20 is used for controlling use of the user devices 11, 12 via the control agent 14 and communicating with a supervisory user via the supervisor application 40. The operation of the control manager 20 is described herein with respect to the user devices 11, 12 and the supervisor device 16. One skilled in the art will recognize that the control manager 20 can operate with other suitable wired or wireless network-connectable computing systems. The control manager 20 includes a model engine 22, a model datastore 24, a user datastore 26, a supervisor application program interface ("API") 28, a control application program interface ("API") 30, a telecommunication carrier ("telecom") interface 32, and an aggregation engine 34.

The control manager 20 can be implemented on one or more network-connectable processor-enabled computing systems, for example in a peer-to-peer configuration, and need not be implemented on a single system at a single location. The control manager 20 is configured for communication via the communications network 8 with other network-connectable computing systems including the user devices 11, 12, supervisor device 16, and a telecommunication carrier system implementing an API ("Telecom API") 80 enabling communications of the user device 11, 12. Alternatively, the control manager 20 or one or more components thereof can be executed on a user device 11, 12 or other system. The supervisor application 40 is provided on the supervisor device 16. The supervisor application 40 can include a downloadable software application specially configured for interface with the supervisor API 28 to receive notices from and communicate control settings to the control manager 20 via the supervisor API 28, the control settings dictating controls implemented by the control manager 20 and the control agent 14. Alternatively, the supervisor application 40 can include a generic web browser or other application allowing a user of the supervisor device 16 to receive notices from and communicate control settings to the control manager 20 via the supervisor API 28.

The control agent 14 monitors electronic communication activity and application use on a user device 11, 12 and determines an amount of time a supervised user uses particular applications or particular categories of applications. The control manager 20 aggregates use times across multiple user devices 11, 12 operated by a particular supervised user via the aggregation engine 34. A supervisory user (e.g. parent) is informed of trends of application use of the supervised user (e.g. child) user via the supervisor application 40. The control agent 14 executes an adaptive screen time policy based on the determined application use of the supervised user, for example use time of a particular application or category of applications exceeding a particular threshold. The control manager 20 can further implement control of user devices 11, 12 via commands to a telecommunication carrier via the telecom API 80 and the telecom interface 32.

Referring to FIGS. 2A, 2B, 2C, 2D, and 2E a user interface 42 enabled by the supervisor application 40 on the supervisor device 16 provides interactive displays such as example interactive displays 100, 102, 110, 112, 114 for entering and editing control settings by a supervisory user such as a parent. A first example interactive display 100 and second example interactive display 102 permit such user to identify and name user devices 11, 12, to identify whether the user devices 11, 12 are shared or assigned to a particular user, name the child and adult users of the user devices 11, 12, and set locations of the user devices 11, 12. The first example interactive display 100 identifies an "electronic media player", a "smart television", and a "desktop computer" as "TV1", "TV2", and "PC1" respectively, "Billy", "Kelly", and "Jimmy" as "child users", "Peter" and "Jeanette" as "adult users", and "living room", "playroom", and "study" at "5 Kent St, 08021" as the locations of the listed devices. A second example interactive display 102 identifies a "video game console", "tablet computer", and a "smart phone" as "Game1", "Tablet1", and "Phone1" respectively. The names "Billy", "Kelly", and "Jimmy" are identified as "child users" of Game 1, "Billy" is identified as the exclusive assigned user of "Tablet1", and "Kelly" is identified as the exclusive assigned user of "Phone1". The address "5 Kent St, 08021" and "living room" are identified as the location of "Game1", and "5 Kent St, 08021" is identified as the location of "Tablet1". The "Phone1" is indicated as "mobile (GPS-enabled)" denoting a wireless device. A third example interactive display 110 identifies supervised user birth date, supervised user gender, use time limit for the supervised user across one or more personal or shared devices, exclusive personal devices and shared devices of the supervised user, and the result that occurs when the supervised user's use time goes over the use time limit.

Control settings from the supervisor device 16 are communicated via the control API 30 of the control manager 20 to the control agent 14 on a user device 11, 12 operated by the supervised user, for example a child of a parent supervisory user operating the supervisor device 16. Control settings can be stored locally on the user device 11, 12 in a control datastore 68 for access by the control agent 14.

A fourth example interactive display 112 and fifth example interactive display 114 may be provided instead of the first and second example interactive displays 100, 102 requiring less detailed user inputs. The fourth and fifth example interactive displays 112, 114 permit a user to identify whether the user devices 11, 12 are shared or assigned to a particular user by entering "family" to indicate a shared user device 11, 12 potentially used by all members of a family or a particular user's name, for example "Billy", to indicate a user to whom the device is specifically assigned. The fourth and fifth example interactive displays 112, 114 further permit a user to indicate a user device 11, 12 is used at a "home", rather than indicating a specific address, or "mobile" for Global Positioning System (GPS) enabled wireless devices.

Figure 3B:
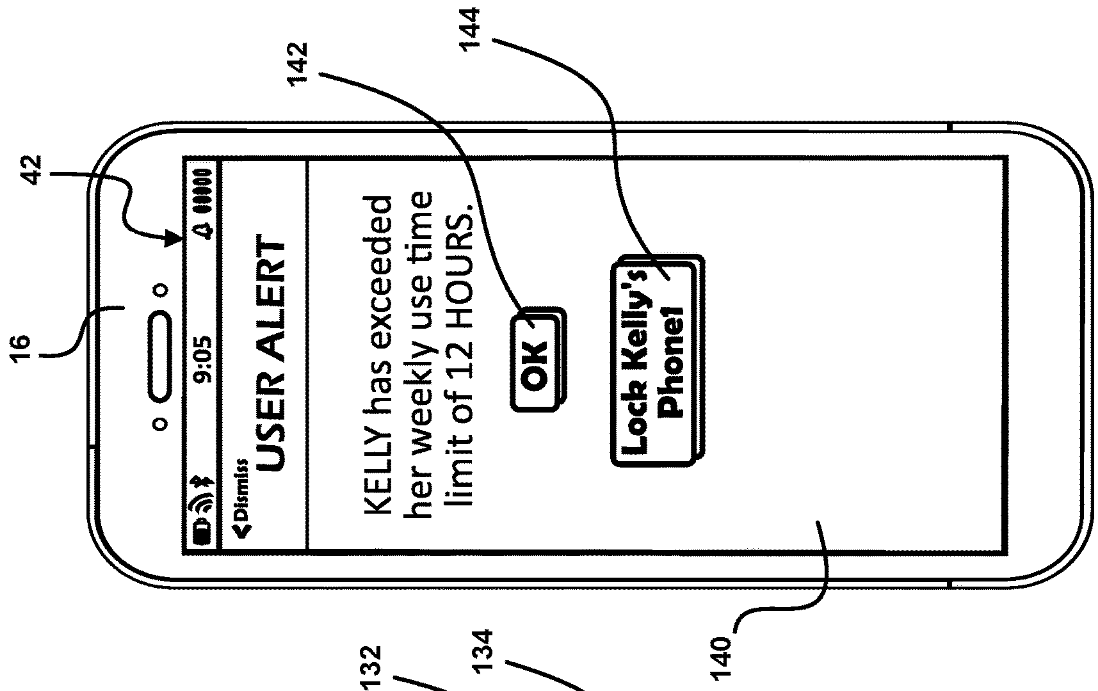
FIGS. 3A-3B show example interactive displays for providing alerts to a supervisory user regarding controlled computing devices.
Figure 3A:
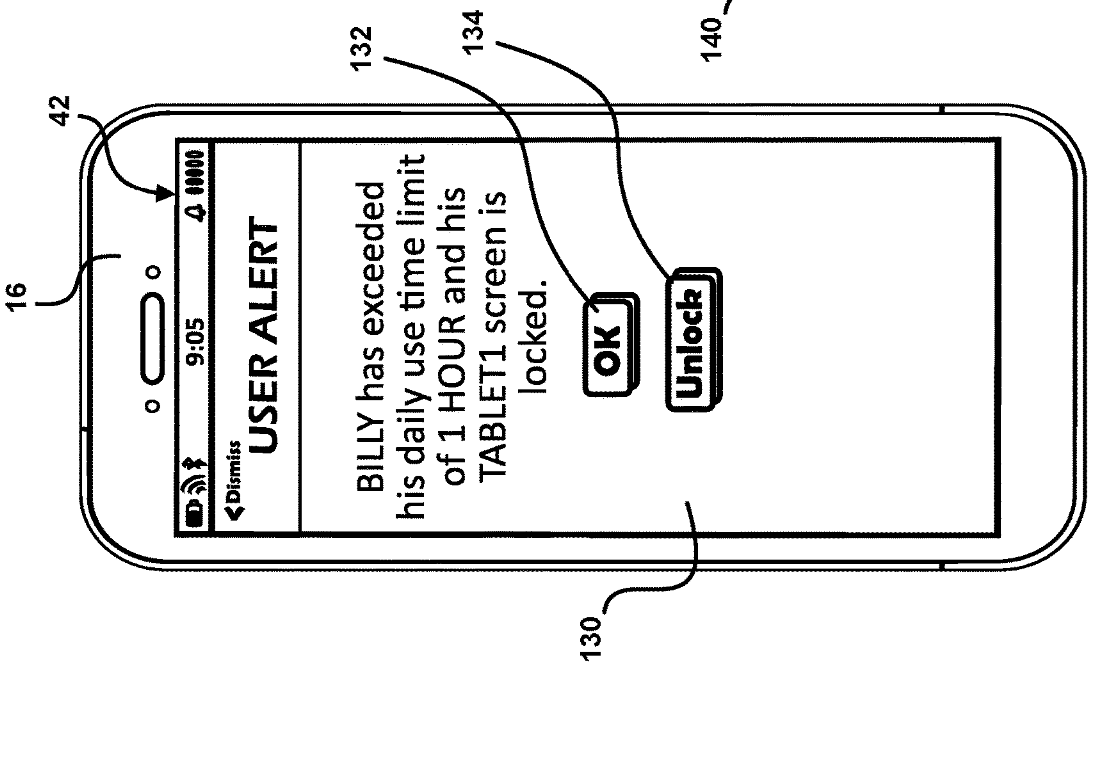

Referring to FIGS. 3A and 3B, the supervisor application 40 via the user interface 42 further enables interactive displays such as example interactive displays 130, 140 for providing alerts and permitting feedback to the control manager 20 by a supervisory user. A sixth example interactive display 130 is generated in response to a determination by the aggregation engine 34 that a supervised user "Billy" has "exceeded his daily use time limit of 1 HOUR", and therefore that "his TABLET1 screen is locked". The TABLET1 can be an OS1 user device 11 or an OS2 user device 12. The supervisory user can dismiss the notice via an "OK" button 132 or re-enable Billy's OS1 user device 11 or OS2 user device 12 via an "Unlock" button 134 sending instructions via the control manager 20 to the control agent 14 on Billy's OS1 user device 11 or OS2 user device 12 to deactivate the screen lock. A seventh example interactive display 140 is generated in response to a determination by the aggregation engine 34 that a supervised user "Kelly" has "exceeded her weekly use time limit of 12 HOURS". The supervisory user can dismiss the notice via an "OK" button 142 or disable Kelly's OS1 user device 11 or OS2 user device 12 via a "Lock Kelly's Phone1" button 144 sending instructions via the control manager 20 to the control agent 14 on Kelly's OS1 user device 11 or OS2 user device 12 to institute a screen lock or other device restriction.

Figure 4C:
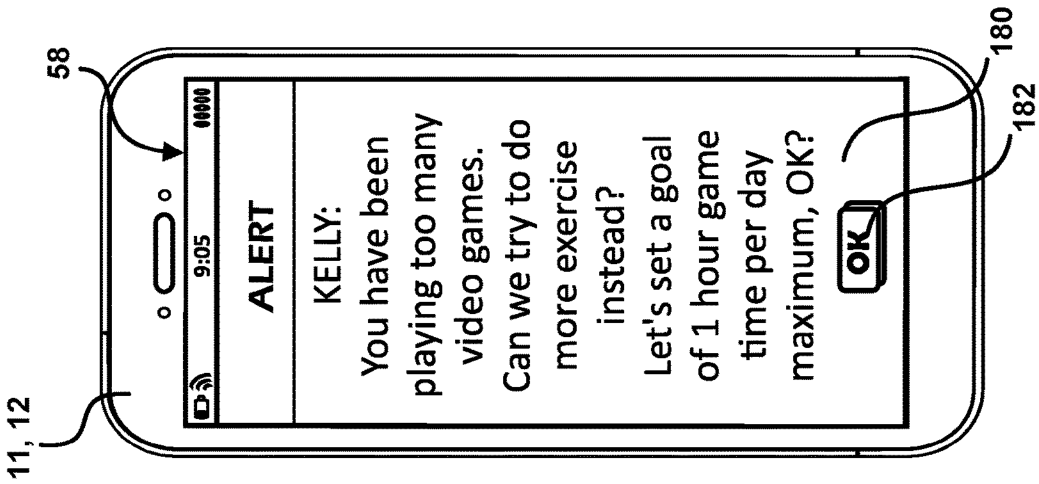
FIGS. 4A-4C show example interactive displays for providing alerts to a supervised user regarding controlled computing devices.
Figure 4B:
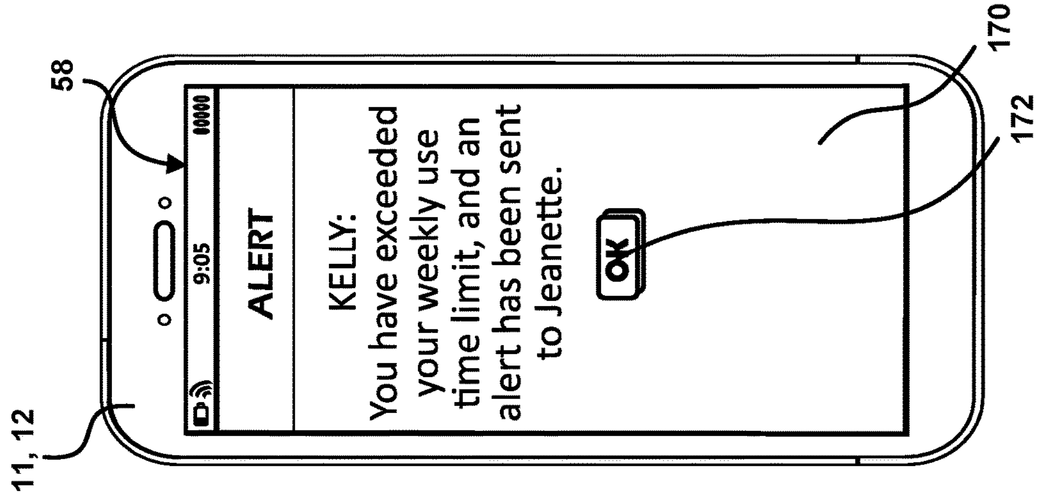
Figure 4A:
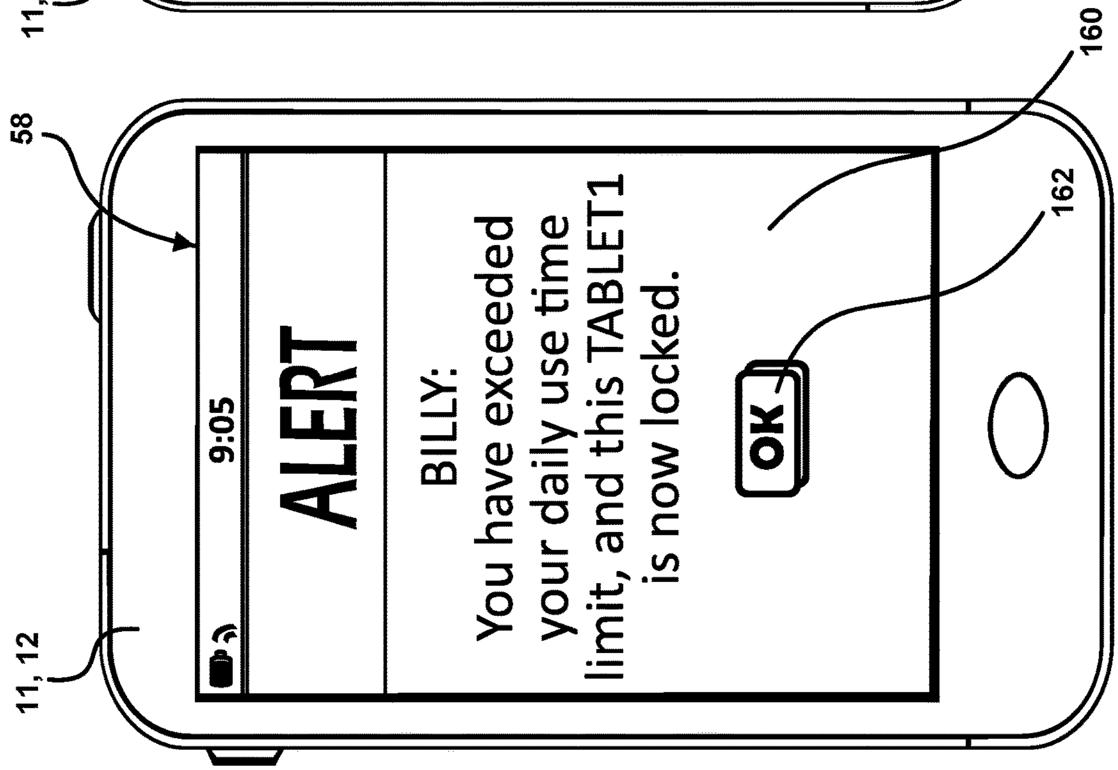

Referring to FIGS. 4A, 4B, and 4C, the control agent 14 on an OS1 user device 11 or an OS2 user device 12 (for convenience referred to as user device 11, 12) enables notifications initiated by determinations of the control manager 20 in the form of example interactive displays 160, 170, 180. An eighth example interactive display 160 is generated by the control agent 14 via a user interface 58 on supervised user Billy's user device 11, 12 in response to a determination by the aggregation engine 34 that Billy has "exceeded [his] daily use time limit". The display 160 indicates as a result that "this TABLET1 is now locked", which locking is performed by the control agent 14 and prevents non-emergency use of the user device 11, 12. A ninth example interactive display 170 is generated by the control agent 14 via a user interface 58 on a supervised user Kelly's user device 11, 12 in response to a determination by the use time engine 34 that Kelly has "exceeded [her] weekly use time limit". The display 170 indicates as a result that "an alert has been sent to [Kelly's mother] Jeanette", and the control agent 14 via the control manager 20 or via a messaging application 50 initiates a communication to Kelly's mother's supervisor device 16 via the supervisor application 40 or a messaging application on the supervisor device 16. A tenth example interactive display 180 is generated by the control agent 14 via the user interface 58 on the supervised user Kelly's user device 11, 12 in response to a determination by the aggregation engine 34 that Kelly has exceeded a particular threshold amount of time using applications classified as games. The tenth example interactive display 180 indicates "KELLY: you have been playing too many video games." The tenth example interactive display 180 further includes the requests "Can we try to do more exercise instead?" and "Let's set a goal of 1 hour game time per day maximum, OK?" Confirmation that the supervised user has viewed the alerts can be made by actuating "OK" buttons 162, 172, 182 on the example interactive displays 160, 170, 180 respectively.

Figure 5:
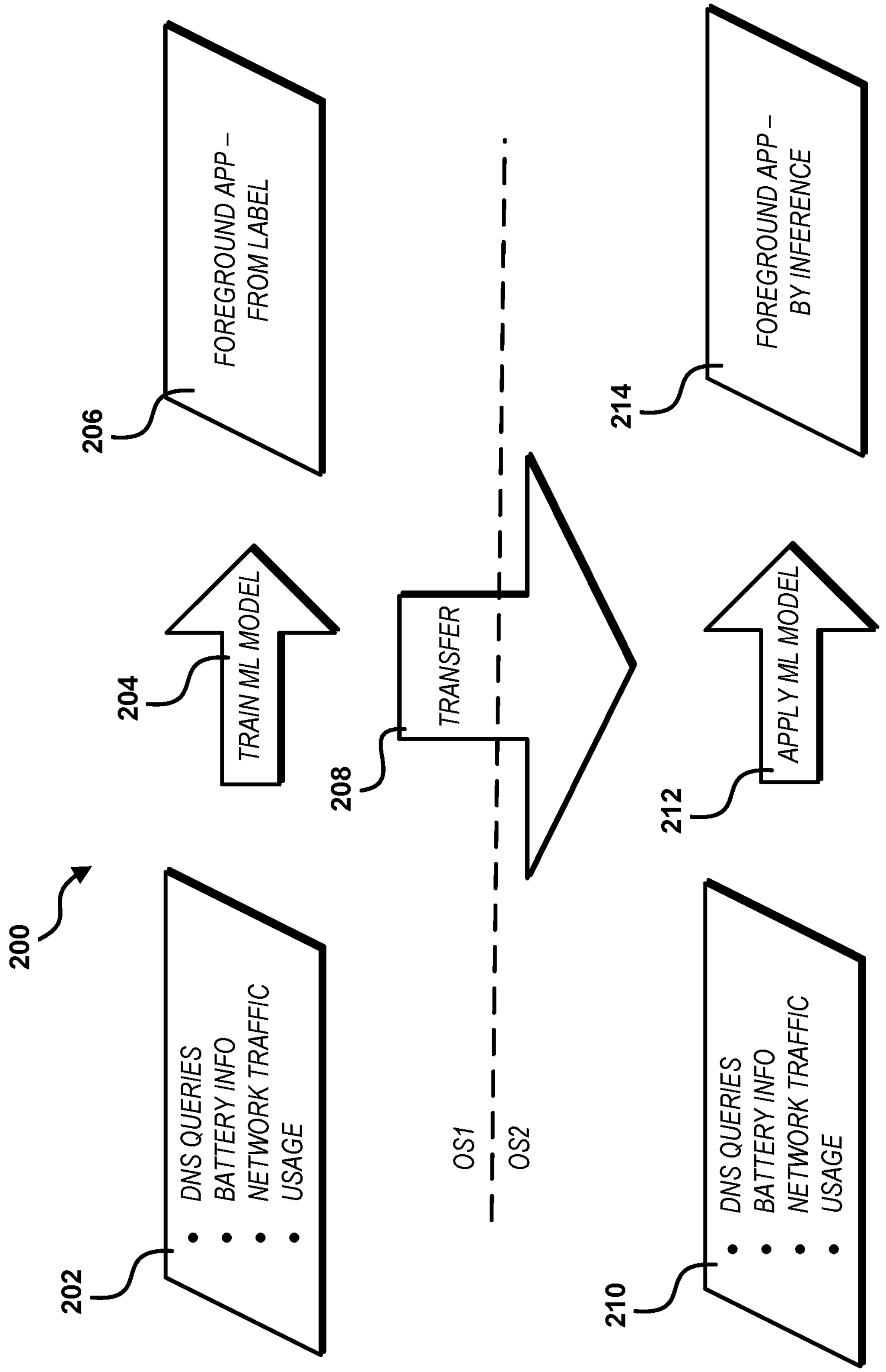
FIG. 5 is a data flow diagram showing a process for training and applying a machine learning model to determine an executed foreground application.

Referring to FIG. 5, a generalized data flow diagram is shown of a process 200 for training and applying a machine learning model to determine an application operating in the foreground of a computing device. The process 200 is described with reference to the components of the system 10 shown in FIG. 1, including the OS1 61, the OS1 user device 11, the OS2 62, the OS2 user device 12, the supervisor device 16, the processor-enabled control manager 20, the control agent 14, and the supervisor application 40. Alternatively, the process 200 can be performed via other suitable systems including other suitable operating systems and computing devices. The process 200 employs transfer learning to train a model using data from an OS1 user device 11 where indications of applications operating in the foreground are available and apply that model to determine applications operating in the foreground on an OS2 user device 12 where foreground application data is unavailable or not easily accessible.

A first data input 202 includes data monitored from the OS1 user device 11 executing the OS1 61 and stored in a log datastore 66. The first data input 202 includes domain name system ("DNS") requests of the OS1 user device 11. The first data input 202 further beneficially includes battery charge data including the change in battery charge over particular time periods, for example time periods between DNS requests and time periods when one or more particular applications were operational in the foreground or in the background. The first data input 202 further beneficially includes network traffic data, for example network metadata corresponding to the time periods when DNS requests are initiated, and device usage data, for example time of use of particular foreground applications. In a training process 204 a machine learning model is trained based on the first data input 202 and a first data output 206 including indications of applications operating in the foreground at respective times coinciding with particular data from the first data input 202.

The first data input 202 can include a plurality of time-stamped DNS queries and the first data output 206 can include indications of a particular application operating in the foreground at the times when the DNS queries were transmitted. Foreground applications can be determined by labels stored in the log datastore 66 of the OS1 user device 11. In a transfer process 208 the trained model or models is communicated via the control manager to an OS2 user device 12.

A second data input 210 includes data monitored from the OS2 user device 12 executing the OS2 62. The second data input 210 includes domain name system ("DNS") requests from a log datastore 66 of the OS2 user device 12. The second data input 210 further beneficially includes battery charge data including the change in battery charge over particular time periods, for example time periods between DNS requests and time periods when one or more particular applications were operational in the foreground and in the background. The second data input 210 further beneficially includes network traffic data, for example network metadata corresponding to the time periods when DNS requests are initiated, and device usage data, for example time of use of particular foreground applications. In a model application process 212, the trained machine learning model is applied to the second data input 210 to generate a second data output 214 including an inferred indication of a particular application operating in the foreground of the OS2 user device 12 at a time corresponding to the data provided in the second data input 210.

To provide a more detailed understanding of the illustrative embodiments, the functioning of OS1 61 is described with reference to an Android™ operating system, which like the described exemplary OS1 61, provides an accessible log of applications operating in the foreground at particular times. Table 1 below provides exemplary data from an Android™ DNS query log. Each row of Table 1 shows a device's identifier, a uniform resource locator ("URL") of a DNS request, a timestamp of the DNS request, an application operating in the foreground during the DNS request, and a state of the display screen of the device during the DNS request.

TABLE 1

| Device_ID | Timestamp | Screen_State | URLS | Foreground_App |
|---|---|---|---|---|
| 82432 | 2019-02-13 15:35:00 | 2 | mvm.snapchat.com | Snapchat |
| 82432 | 2019-02-13 15:35:00 | 2 | mvm.snapchat.com | Snapchat |
| 82432 | 2019-02-13 15:35:00 | 2 | us-central1-gcp.api.snapchat.com | Snapchat |
| 82432 | 2019-02-13 15:35:00 | 2 | app-analytics.snapchat.com | Snapchat |
| 82432 | 2019-02-13 15:35:00 | 2 | us-central1-gcp.api.snapchat.com | Snapchat |

To further provide a more detailed understanding of the illustrative embodiments, the functioning of OS2 62 is described with reference to an iOS™ operating system, which like the described exemplary OS2 62, fails to provide an accessible log of applications operating in the foreground at particular times. Table 2 below provides exemplary data from an iOS™ DNS query log. Each row of Table 2 shows a device's identifier, a uniform resource locator ("URL") of a DNS request, a timestamp of the DNS request, and a state of the display screen of the device during the DNS request. The application operating in the foreground during the DNS request is not rendered accessible by the iOS™ operating system and accordingly is entered as "NaN" (i.e., "not a number").

TABLE 2

| Device_ID | Timestamp | Screen_State | URLs | Foreground_App |
|---|---|---|---|---|
| 78940 | 2019-02-14 01:07:00 | 2 | feelinsonice-mvm.I.google.com | NaN |
| 78940 | 2019-02-14 01:07:00 | 2 | mvm.snapchat.com | NaN |
| 78940 | 2019-02-14 01:07:00 | 2 | mvm.snapchat.com | NaN |
| 78940 | 2019-02-14 01:07:00 | 2 | mvm.snapchat.com | NaN |
| 78940 | 2019-02-14 01:07:00 | 2 | app.snapchat.com | NaN |

Figure 6:
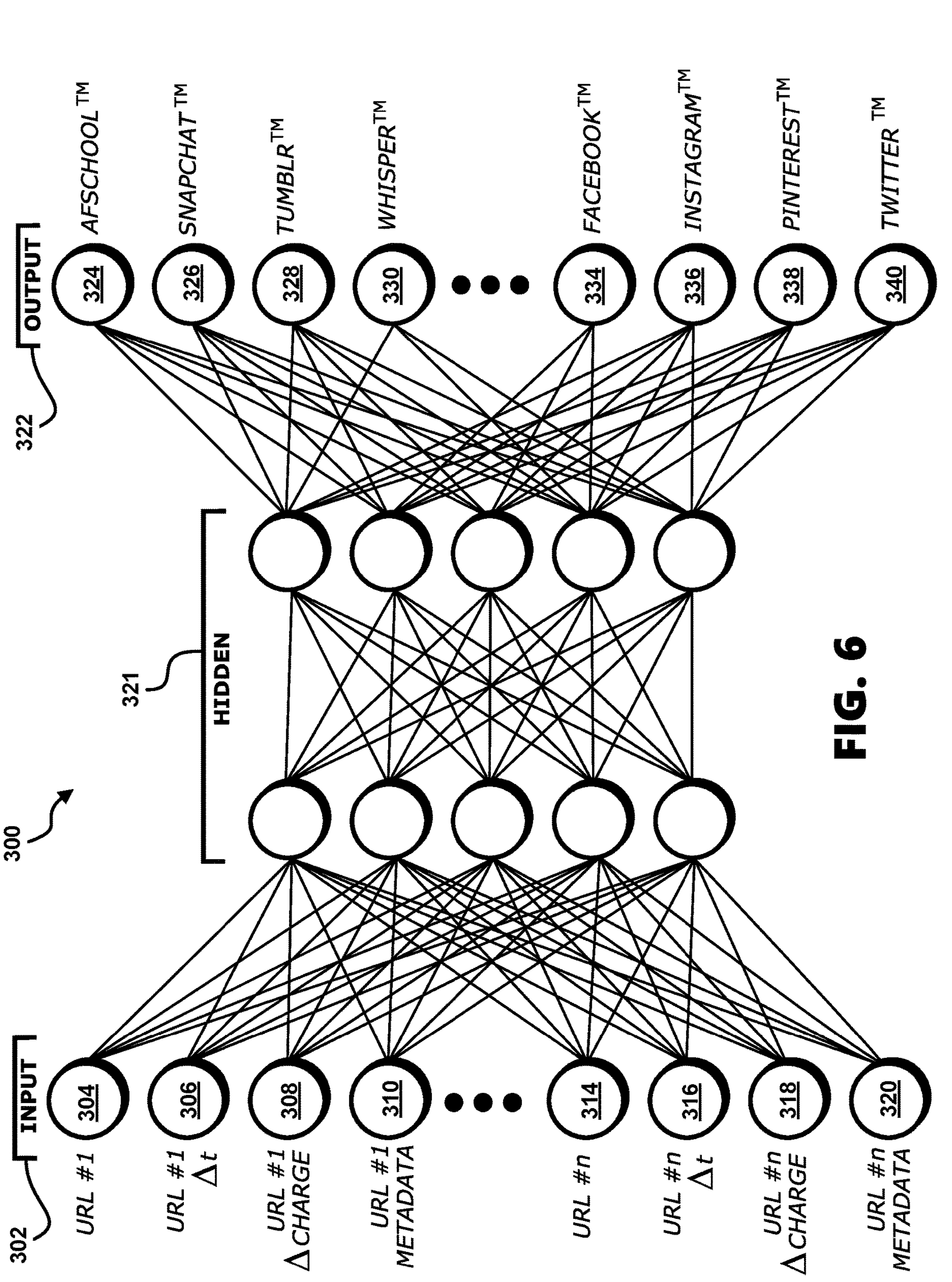
FIG. 6 is a diagram figuratively showing a model in the form of a convolutional artificial neural network for determining an executed foreground application.

Referring to FIG. 6, an exemplary convolutional artificial neural network 300 is shown including an input layer 302 including source data described herein with reference to the first data input 202 and the second data input 210. Particularly, the input layer 302 includes a plurality of URLs represented by a first URL 304 and an nth URL 314 for which a DNS request was initiated. For each URL 304, 314, the input layer 302 further includes a change in time 306, 316 before a next DNS request, a change in battery charge 308, 318 during a particular period of time after the DNS request, and particular metadata 310, 320 (e.g., author, creation date) scraped from the respective URLs 304, 314. An output layer 322 of the convolutional artificial neural network 300 includes a prediction of which of a plurality of applications is operated in the foreground. The output layer 322 is shown with an exemplary list of social media applications 52 including After School™ 324, Snapchat™ 326, Tumbler™ 328, Whisper™ 330, Facebook™ 334, Instagram™ 336, Pinterest™ 338, and Twitter™ 340. Alternatively, messaging applications 50, electronic media players 56, gaming applications 57, or other applications executable on the OS1 user device 11 or OS2 user device 12 can be included in the output layer 322. Hidden layers of nodes 321 are shown for convenience of illustration as two five node rows. Alternatively, other suitable number and arrangement of hidden nodes can be implemented.

In training the convolutional artificial neural network 300, the URLs 304, 314, changes in time 306, 316, changes in battery charge 308, 318, and metadata 310, 320 are provided in the input layer 302, the indication of an application operating in the foreground is provided in output layer 322, and backpropagation is beneficially employed. Alternatively, other machine learning protocols may be implemented for training the convolutional artificial neural network 300. Training is beneficially performed based on data monitored by a control agent 14 from the OS1 user device 11, wherein the OS1 61 enables direct monitoring of applications operating in the foreground via the log datastore 66. The trained convolutional artificial neural network 300 can be applied to URLs 304, 314, changes in time 306, 316, changes in battery charge 308, 318, and metadata 310, 320 monitored by the control agent 14 from the OS2 user device 12 which, as described herein, does not allow for direct monitoring of applications operating in the foreground via the OS2 12.

Figure 7A:
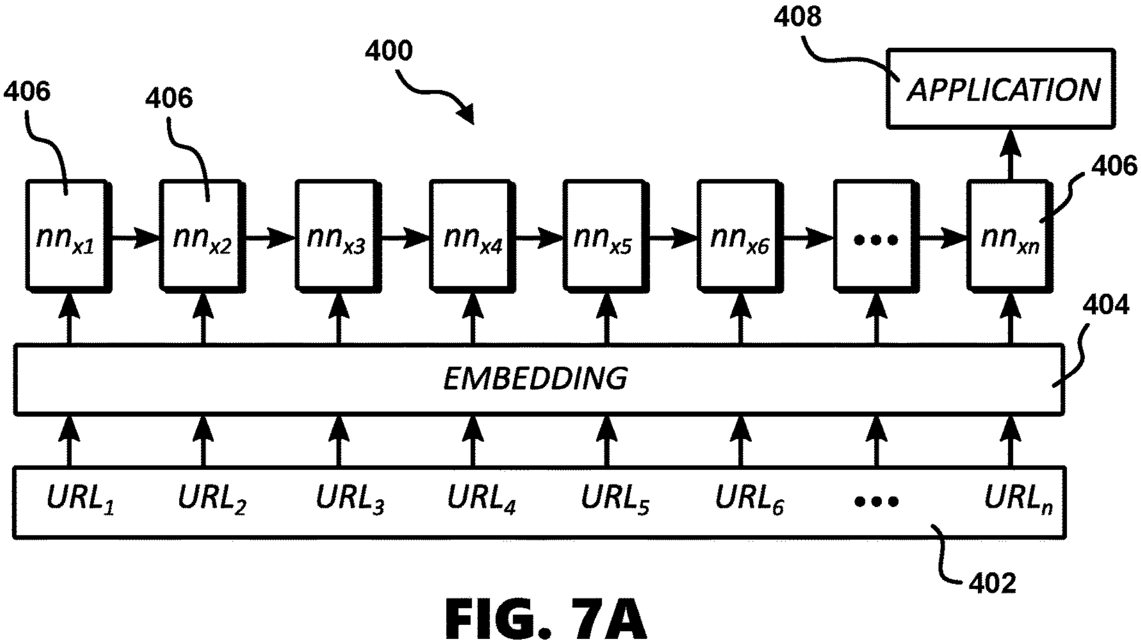
FIG. 7A is a diagram figuratively showing a model in the form of an artificial recurrent neural network ("RNN") for determining an executed foreground application.

Referring to FIG. 7A, an exemplary model in the form of an artificial recurrent neural network ("RNN") 400 is shown useful for performing herein-described methods. Alternatively, other model types can be implemented such as Naïve Bayes, logistic regression, decision tree, boosted tree, support vector machine, nearest neighbor, dimensionality reduction algorithm, or gradient boosting algorithm models. The RNN 400 includes an input layer 402, an embedding layer 404, hidden nodes 406, and an output 408 including an indication of an application operating in the foreground ("application output" 408). The input layer 402 includes time-ordered sequence of DNS requests ($URL_1$, $URL_2$, . . . $URL_n$) initiated by one or more of the messaging applications 50, social media applications 52, browsers 54, media players 56, and gaming applications 57. The RNN 400 can be run for example by the model engine 22 of the control manager 20 based on monitored data from the control agent 14 on the OS1 user device 11 or the OS2 user device 12. The embedding layer 404, for example implementing a Word2vec embedding algorithm, creates vector representations of the input URLs. The hidden nodes 406 sequentially implement neural network algorithms ($nn_{x1}$, $nn_{x2}$, . . . $nn_{xn}$) on vectorized URLs providing feedback to subsequent nodes 406 to generate the application output 408. The application output 408 includes an application operating in the foreground on the OS 1 user device 11 (i.e., during model training) and OS2 user device 12 (i.e., during model applying).

Figure 7B:
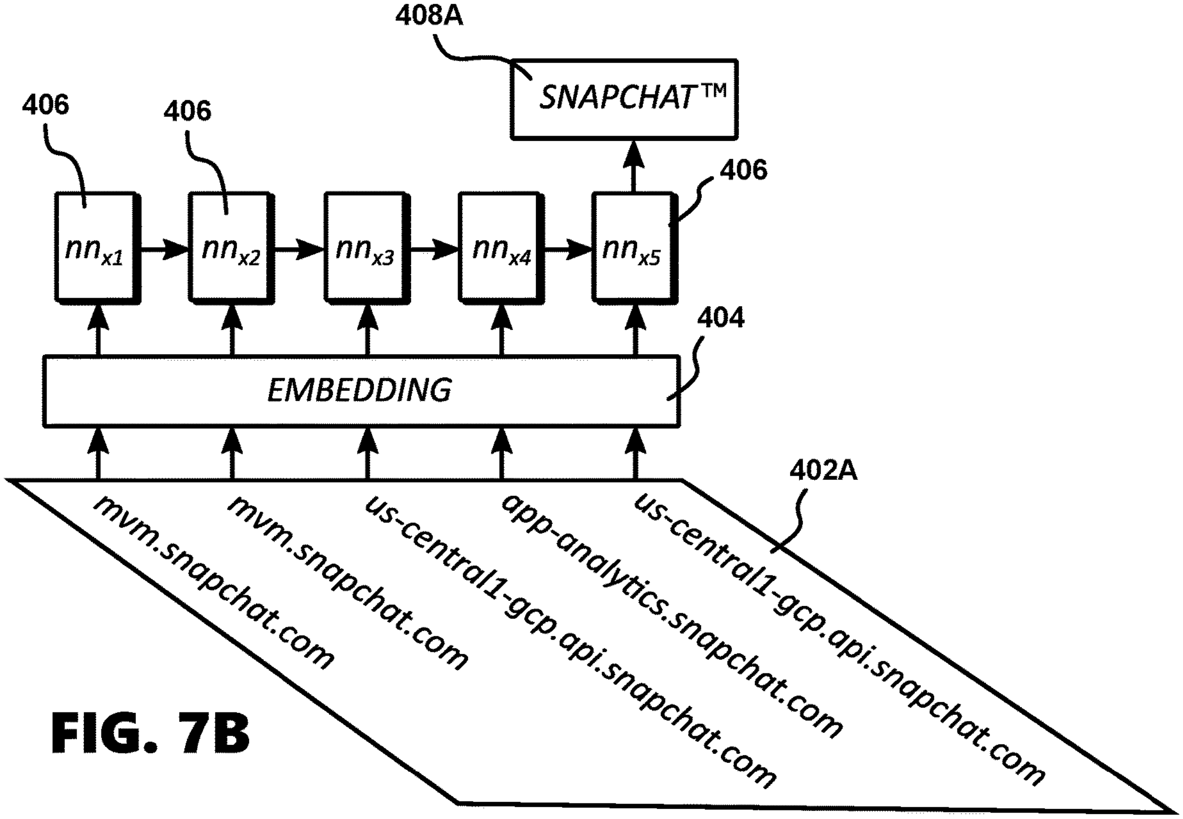
FIG. 7B is a diagram figuratively showing an example implementation of the model of FIG. 7A.

Referring to FIG. 7B, an exemplary implementation of the RNN 400 is shown in which the URLs of Table 1 are input as an input layer 402A and an application output 408A includes the social media application Snapchat™. The RNN 400 is beneficially trained using URL data from initiated DNS requests and an indication of an application operating in the foreground on an OS1 user device 11 during the DNS requests. The RNN 400 beneficially is applied to URL data from initiated DNS requests on an OS2 user device 12 to predict an application operating in the foreground on the OS2 user device 12 which does not enable access to foreground application data.

Figure 8A:
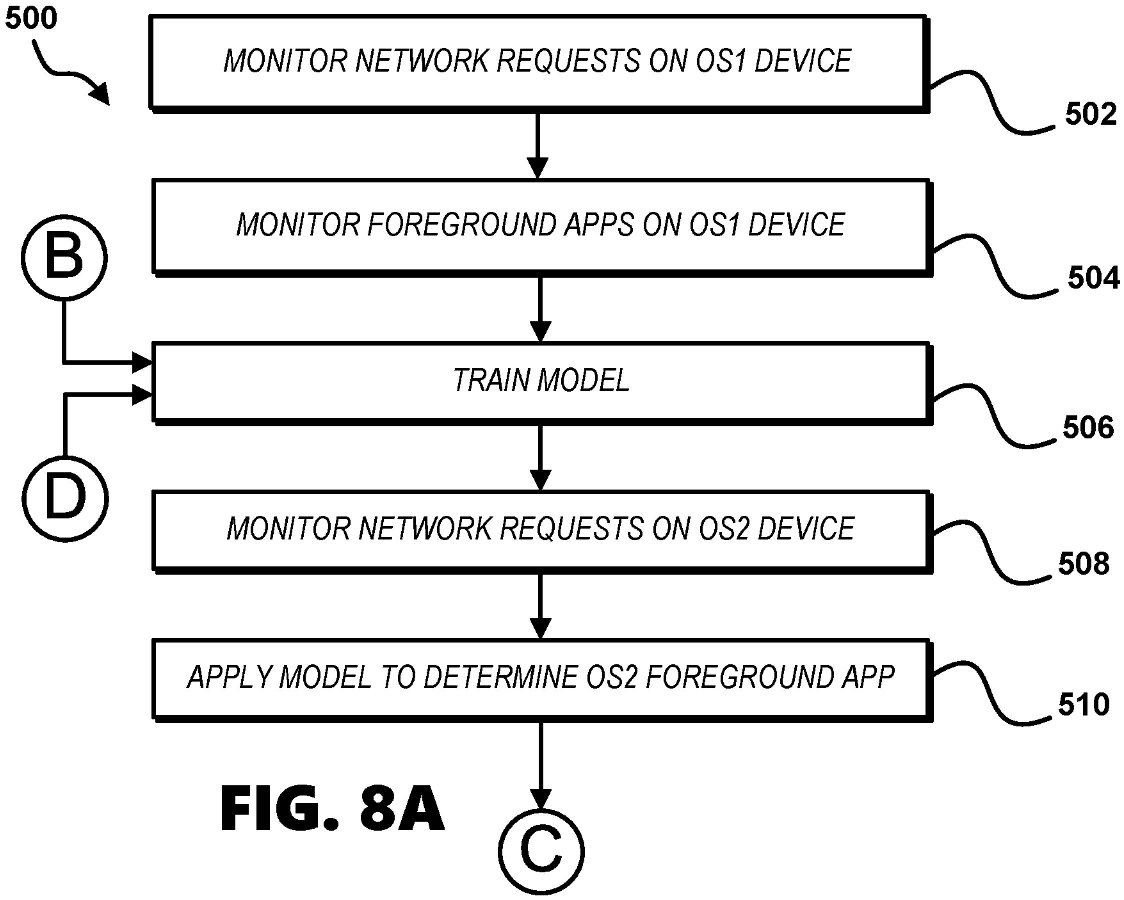
FIGS. 8A-8D are flow charts showing methods for controlling computing devices based on computing device use.

Referring to FIG. 8A, a flowchart shows a method 500 of controlling use of network-connectable devices. The method 500 and associated processes are described with reference to the components of the system 10 shown in FIG. 1, including the OS1 user device 11, OS2 user device 12, the supervisor device 16, the processor-enabled control manager 20, the control agent 14, and the supervisor application 40. Alternatively, the method 500 can be performed via other suitable systems.

The method 500 includes monitoring by the control agent 14 a first plurality of network requests from one or more first user devices executing a first operating system, hereinafter the "OS1 user device 11" (step 502). The monitoring of the first plurality of network requests beneficially includes monitoring a first plurality of domain name system ("DNS") requests, for example collecting a first plurality of URLs included in the DNS requests from a DNS query log of the log datastore 66 of the OS1 user device 11. The control agent 14 monitors a plurality of applications operating in the foreground on the one or more OS1 user devices 11 respectively during the first plurality of network requests (step 504). Thereby, the control agent 14 detects which application is operated in the foreground during each network request (e.g. a DNS request) at particular times and associates each network request (e.g. including a URL) with a foreground application at the particular times. The monitoring of the plurality of applications operating in the foreground on the one or more OS1 user devices 11 can be performed by collecting foreground application labels stored in the log datastore 66 of a respective OS1 user device 11. One or more models are trained based on the first plurality of network requests and based on the applications operating in the foreground on the one or more OS1 user devices 11 respectively during the first plurality of network requests (step 506). The training of the one or more models based on the first plurality of network requests beneficially includes providing vector representations of first network traffic as inputs to the one or more models. Particularly, the training of the one or more models beneficially includes converting the first plurality of DNS requests to a first plurality of embedding vectors.

A second plurality of network requests from a second user device executing a second operating system, hereinafter the "OS2 user device 12", are monitored (step 508). The monitoring of the second plurality of network requests beneficially includes monitoring a second plurality of domain name system ("DNS") requests, for example collecting a second plurality of URLs included in the DNS requests from a DNS query log of the log datastore 66 of the OS2 user device 12. The one or more models are applied to the second plurality of network requests from the OS2 user device 12 to determine a particular application operating in the foreground on the OS2 user device 12 (step 510). The applying of the one or more models based on the second plurality of network requests beneficially includes providing vector representations of second network traffic as inputs to the one or more models. Particularly, the applying of the one or more models beneficially includes converting the second plurality of DNS requests to a second plurality of embedding vectors.

In addition to monitoring the first plurality of network requests in step 502, the control agent 14 can further monitor changes in battery charge, screen state, network traffic levels, and application usage levels on the OS1 user device 11. The one or more models can be further trained based on the monitored changes in battery charge, screen state, network traffic levels, and application usage levels on the OS1 user device 11. The control agent 14 can further monitor changes in battery charge, screen state, network traffic levels, and application usage levels on the OS2 user device 12. The control agent 14 can apply the one or more models to the monitored changes in battery charge, screen state, network traffic levels, and application usage levels on the OS2 user device 12 to determine the particular application operating in the foreground on the OS2 user device 12.

The trained and applied model or models can include for example a decision tree algorithm, random forest algorithm, convolution neural network ("CNN"), or a long short-term memory artificial recurrent neural network ("LSTM RNN"). Decision tree and random forest algorithms are especially suited for classification tasks. An LSTM RNN can employ deep learning architecture and is well suited for receiving inputs of time series data. When an LSTM RNN is implemented, the monitoring of the first plurality of network requests beneficially includes collecting first time series data from the OS1 user device 11, and the LSTM RNN is trained on the first time series data. The monitoring of the second plurality of network requests beneficially includes collecting second time series data from the OS2 user device 12, and the LSTM RNN is applied to the second time series data to determine the particular application operating in the foreground on the OS2 user device 12.

A CNN based model can employ deep learning architecture beneficial for example in processing high dimensional data. A CNN based model is well suited for receiving as a plurality of additional input data in addition to network requests. For example, the control agent 14 can further monitor one or more of battery charge, network traffic level, application usage level, and screen state of the OS1 user device 11 and the OS2 user device 12. The CNN can be trained based on the first plurality of network requests of step 502 and the one or more of the battery charge, the network traffic levels, the application usage levels, or the screen state of the OS1 user device 11. The CNN is applied to the second plurality of network requests of step 508 and the one or more of the battery charge, the network traffic level, the application usage level, or the screen state of the OS2 user device 12 to determine the particular application operating in the foreground on the OS2 user device 12.

Figure 8B:
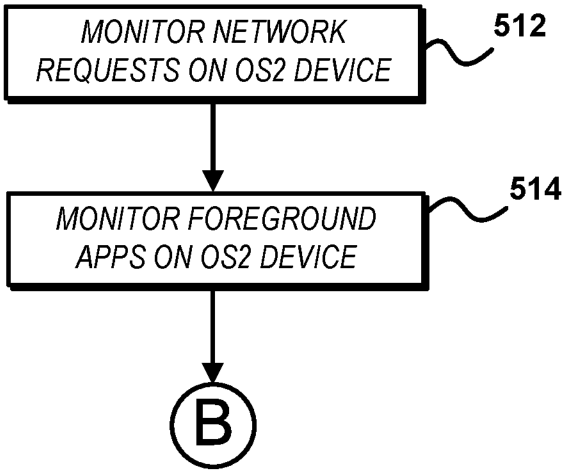

The one or more models described in the method 500 can be refined by monitoring network requests and applications operating in the foreground on one or more other OS2 user devices 12 specially configured or operated in a test environment to enable the detecting of the foreground application. The network requests, beneficially including URLs or DNS requests, on the other OS2 user devices 12 and the detected foreground applications can be used to further train the one or more models useful for inferring foreground applications on OS2 user devices 12 for which data indicating a foreground application is not accessible. Referring to FIG. 8B, optional addition steps to the method 500 can include monitoring a third plurality of network requests from one or more other OS2 user devices (step 512), and monitoring another plurality of applications operating in the foreground on the one or more other OS2 user devices 12 respectively during the third plurality of network requests (step 514). The model training step 506 then further includes training the one or more models further based on the third plurality of network requests and the other plurality of applications operating in the foreground on the one or more other OS2 user devices respectively during the third plurality of network requests.

Figure 8C:
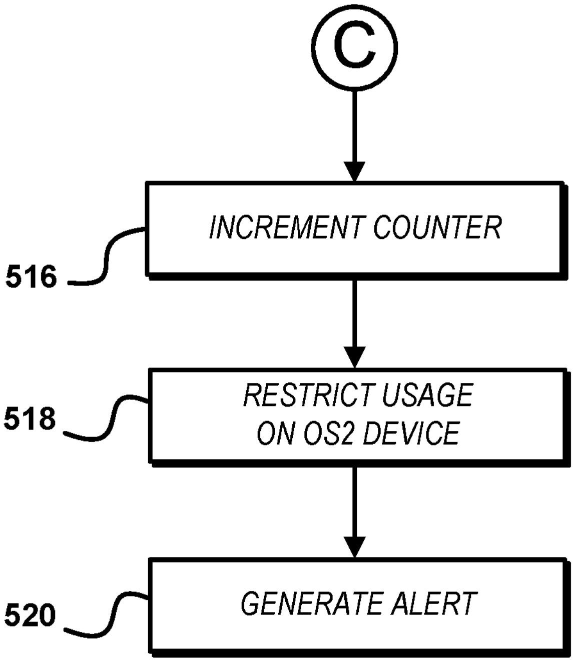

Referring to FIG. 8C, the control agent 14 on the OS2 user device 12 or alternatively the aggregation engine 34 of the control manager 20 can increment a counter based on the determining of the particular application operating in the foreground on the OS2 user device 12 (step 516). The counter beneficially tracks the time the particular application or other designated applications are operating in the foreground. The control agent 14 restricts one or more functions of the OS2 user device 12 based on the tracked time measured by the counter crossing a particular threshold (step 518). Restricting the one more functions can include disabling an application or a functional component of the OS2 user device 12 assigned to a particular user to restrict usage of the OS2 user device 12. Alternatively, a control agent 14 executed on another OS2 user device 12 or OS1 user device 11 assigned to such particular user can restrict one or more functions on such other OS2 user device 12 or OS1 user device 11, for example based on aggregated use time of the particular application in the foreground by the particular user across multiple user devices 11, 12. Alternatively or in addition to restricting one or more functions of the OS2 user device 12, an alert can be generated responsive to the counter crossing a particular threshold, which alert can be transmitted to a supervisor device 16 via the control manager 20 (step 520). Alerts can include reports indicating aggregated use time of the particular application in the foreground or categories of applications based on the counter. Further, use time reports can be transmitted periodically to a supervisor device 16 via the control manager 20.

A supervisory user via the supervisor application 40 can set rules for threshold times of use of particular applications across multiple user devices 11, 12 used by a particular supervised user. The aggregation engine 34 of the control manager 20 aggregates time of use which is incremented when a particular application is determined to be operated in the foreground on a user device 11, 12, which determination can be made by direct monitoring of labels on an OS1 user device 11 or by inference by use of a model on an OS2 user device 12.

Figure 8D:
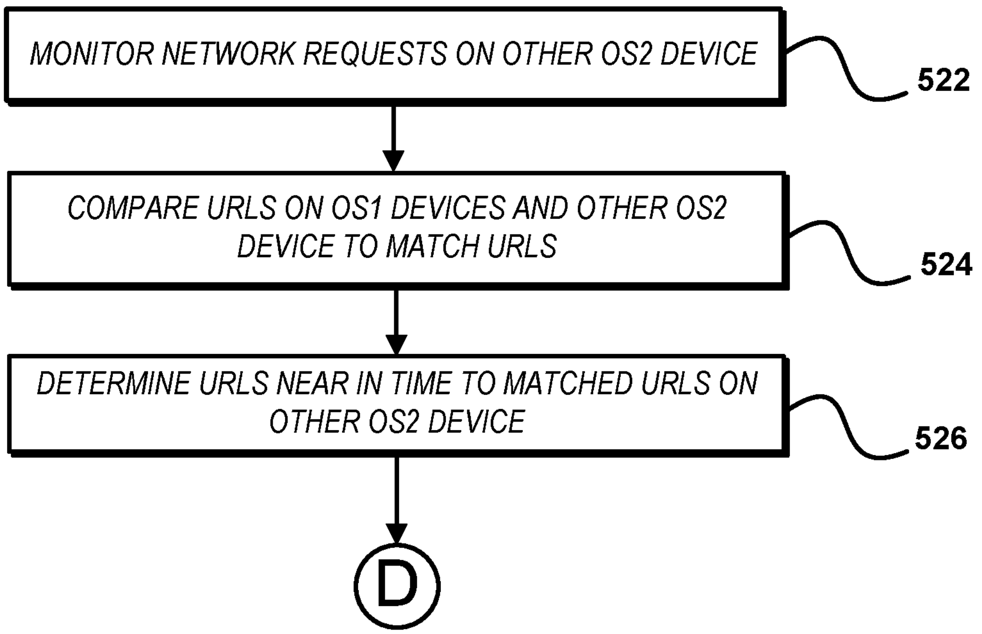

DNS requests of an OS1 user device 11 may differ from DNS requests of an OS2 user device 12 under similar conditions where a particular application is operating in the foreground. To refine the one or more models for inferring a foreground application, URLs from DNS requests detected by a control agent 14 on an OS2 user device 12 are beneficially included in unsupervised training of embedding vectors, for example the embedding layer 404 of the RNN 400. In a refinement to the method 500, referring to FIG. 8D a third plurality of network requests are monitored by a control agent 14 from one or more third user devices executing the second operating system, hereinafter "other OS2 device 12" (step 522). In this refinement, the monitoring of the first plurality of network requests from the OS1 user device 11 of step 502 includes collecting URLs of DNS requests of the OS1 user device 11. The monitoring of the third plurality of network requests from the other OS2 user device 12 includes collecting URLs of DNS requests of the other OS2 user device 12. The URLs of the DNS requests of the OS1 user device 11 and the URLs of the DNS requests of the other OS2 user device 12 are compared to determine matching DNS requests on the other OS2 user device 12 (step 524). Particular URLs of particular DNS requests near in time to the matching DNS requests on the other OS2 user device 12 are determined (step 526). The model training step 506 incorporates these particular URLs by using them as inputs to the model along with URLs of the matching DNS requests which correspond to known foreground applications used as model outputs. Therefore when some of the URLs of DNS requests of an OS2 user device 12 differ from the URLs of DNS requests of an OS1 user device 11 when the same application is operating in the foreground, this information can be used in improving a model for inferring foreground applications on an OS2 user device 12.

Figure 9:
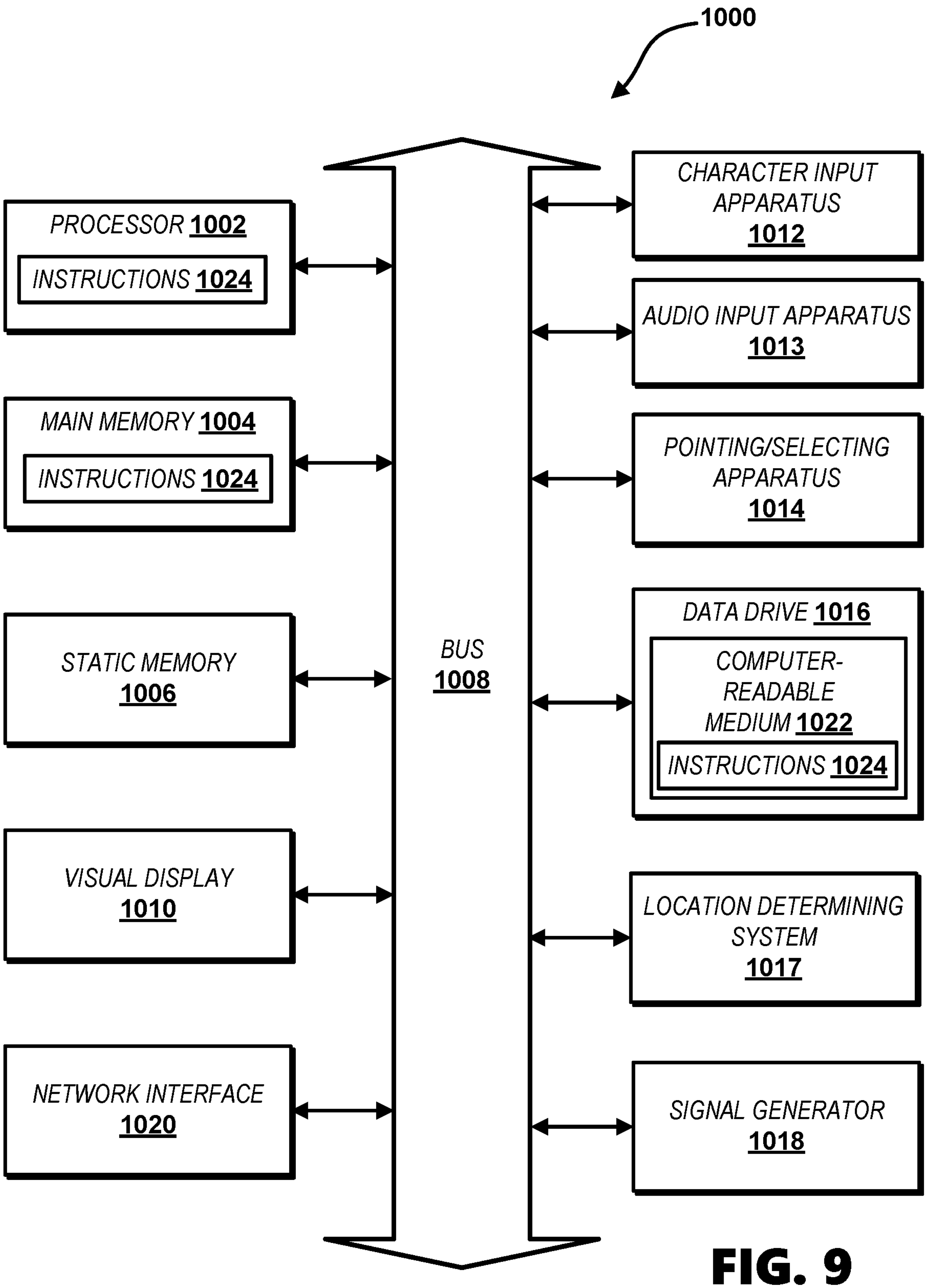
FIG. 9 is an illustrative computer system for performing described computing device control methods according to the illustrative embodiments.

FIG. 9 illustrates in abstract the function of an exemplary computer system 1000 on which the systems, methods and processes described herein can execute. For example, the OS1 user device 11, OS2 user device 12, supervisor device 16, control manager 20, and telecom API 80 can each be embodied by a particular computer system 1000. The computer system 1000 may be provided in the form of a personal computer, laptop, handheld mobile communication device, mainframe, distributed computing system, or other suitable configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 1024 executable by the computer system 1000.

The computer system 1000 can operate as a standalone device or can be connected (e.g., networked) to other machines. In a networked deployment, the computer system 1000 may operate in the capacity of a server or a client machine in server-client network environment, or as a peer machine in a peer-to-peer (or distributed) network environment. The computer system 1000 can also be considered to include a collection of machines that individually or jointly execute a set (or multiple sets) of instructions to perform one or more of the methodologies described herein.

It would be understood by those skilled in the art that other computer systems including but not limited to networkable personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a communications network, and in which program modules can be located in both local and remote memory storage devices.

The exemplary computer system 1000 includes a processor 1002, for example a central processing unit (CPU) or a graphics processing unit (GPU), a main memory 1004, and a static memory 1006 in communication via a bus 1008. A visual display 1010 for example a liquid crystal display (LCD), light emitting diode (LED) display or a cathode ray tube (CRT) is provided for displaying data to a user of the computer system 1000. The visual display 1010 can be enabled to receive data input from a user for example via a resistive or capacitive touch screen. A character input apparatus 1012 can be provided for example in the form of a physical keyboard, or alternatively, a program module which enables a user-interactive simulated keyboard on the visual display 1010 and actuatable for example using a resistive or capacitive touchscreen. An audio input apparatus 1013, for example a microphone, enables audible language input which can be converted to textual input by the processor 1002 via the instructions 1024. A pointing/selecting apparatus 1014 can be provided, for example in the form of a computer mouse or enabled via a resistive or capacitive touch screen in the visual display 1010. A data drive 1016, a signal generator 1018 such as an audio speaker, and a network interface 1020 can also be provided. A location determining system 1017 is also provided which can include for example a GPS receiver and supporting hardware.

The instructions 1024 and data structures embodying or used by the herein-described systems, methods, and processes, for example software instructions, are stored on a computer-readable medium 1022 and are accessible via the data drive 1016. Further, the instructions 1024 can completely or partially reside for a particular time period in the main memory 1004 or within the processor 1002 when the instructions 1024 are executed. The main memory 1004 and the processor 1002 are also as such considered computer-readable media.

While the computer-readable medium 1022 is shown as a single medium, the computer-readable medium 1022 can be considered to include a single medium or multiple media, for example in a centralized or distributed database, or associated caches and servers, that store the instructions 1024. The computer-readable medium 1022 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, CD-ROM and DVD-ROM disks, Erasable Programmable Read-Only Memory (EPROM), Electrically Erasable Programmable Read-Only Memory (EEPROM), and flash memory devices).

The instructions 1024 can be transmitted or received over a communications network, for example the communications network 8, using a signal transmission medium via the network interface 1020 operating under one or more known transfer protocols, for example FTP, HTTP, or HTTPs. Examples of communication networks include a local area network (LAN), a wide area network (WAN), the Internet, mobile telephone networks, Plain Old Telephone (POTS) networks, and wireless data networks, for example WiFi™ and 3G/4G/5G cellular networks. The term "computer-readable signal medium" can further be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor. While embodiments have been described in detail above, these embodiments are non-limiting and should be considered as merely exemplary. Modifications and extensions may be developed, and all such modifications are deemed to be within the scope defined by the appended claims.

What is claimed is:

1. A method of controlling use of network-connectable devices, the method comprising:

monitoring a first plurality of network requests from at least a first user device executing a first operating system;

monitoring a plurality of applications operating in the foreground on the at least the first user device respectively during the first plurality of network requests;

training at least one model based on the first plurality of network requests and the applications operating in the foreground on the at least the first user device respectively during the first plurality of network requests;

monitoring a second plurality of network requests from a second user device executing a second operating system;

applying the at least one model to the second plurality of network requests from the second user device to determine a particular application operating in the foreground on the second user device; and restricting a function of the second user device at least based on the determining of the particular application operating in the foreground on the second user device.

2. The method of claim 1, wherein:

the monitoring of the first plurality of network requests from the at least the first user device comprises monitoring a first plurality of domain name system ("DNS") requests; and the monitoring of the second plurality of network requests from the second user device comprises monitoring a second plurality of domain name system ("DNS") requests.

3. The method of claim 1, further comprises:

monitoring change in battery charge of the at least the first user device;

training the at least one model further based on the battery charge of the at least the first user device;

monitoring change in battery charge of the second user device; and applying the at least one model further to the to the change in battery charge of the second user device to determine the particular application operating in the foreground on the second user device.

4. The method of claim 1, further comprising:

monitoring network traffic levels of the at least the first user device;

training the at least one model further based on the network traffic levels of the at least the first user device;

monitoring network traffic levels of the second user device; and applying the at least one model further to the network traffic levels of the second user device to determine the particular application operating in the foreground on the second user device.

5. The method of claim 1, further comprising:

monitoring application usage levels of the at least the first user device;

training the at least one model further based on the usage levels of the at least the first user device;

monitoring usage levels of the second user device; and applying the at least one model further to the application usage levels of the second user device to determine the particular application operating in the foreground on the second user device.

6. The method of claim 1, further comprising:

monitoring a screen state of the at least the first user device;

training the at least one model further based on the screen state of the at least the first user device;

monitoring a screen state of the second user device; and applying the at least one model further to the screen state of the second user device to determine the particular application operating in the foreground on the second user device.

7. The method of claim 1, wherein training the at least one model comprises training a decision tree algorithm, and applying the at least one model comprises applying the decision tree algorithm.

8. The method of claim 1, wherein training the at least one model comprises training a random forest algorithm, and applying the at least one model comprises applying the random forest algorithm.

9. The method of claim 1, wherein:

the monitoring of the first plurality of network requests comprises collecting first time series data from the at least the first user device;

training the at least one model comprises training a long short-term memory ("LSTM") artificial recurrent neural network based on the first time series data;

the monitoring of the second plurality of network requests comprises collecting second time series data from the second user device; and applying the at least one model comprises applying the LSTM artificial recurrent neural network to the second time series data to determine the particular application operating in the foreground on the second user device.

10. The method of claim 1, the method further comprising monitoring at least one of battery charge, network traffic level, application usage level, or screen state of the at least the first user device and the second user device, wherein:

training the at least one model comprises training a convolution neural network ("CNN") based on the first plurality of network requests and the at least one of the battery charge, the network traffic level, the application usage level, or the screen state of the at least the first user device; and applying the at least one model comprises applying the CNN to the at least one of the battery charge, the network traffic level, the application usage level, or the screen state of the second user device to determine the particular application operating in the foreground on the second user device.

11. The method of claim 1, wherein:

the monitoring of the first plurality of network requests from the at least the first user device comprises monitoring a first plurality of domain name system ("DNS") requests; and the training of the at least one model comprises converting the first plurality of DNS requests to a first plurality of embedding vectors.

12. The method of claim 1, wherein:

the monitoring of the first plurality of network requests from the at least the first user device comprises collecting domain name system ("DNS") requests from a first DNS query log; and the monitoring of the second plurality of network requests from the second user device comprises collecting DNS requests from a second DNS query log.

13. The method of claim 1, wherein the monitoring of the plurality of applications operating in the foreground on the at least the first user device comprises collecting foreground application labels.

14. The method of claim 1, further comprising:

monitoring a third plurality of network requests from at least a third user device executing the second operating system;

monitoring another plurality of applications operating in the foreground on the at least the third user device respectively during the third plurality of network requests; and training the at least one model further based on the third plurality of network requests and the another plurality of applications operating in the foreground on the at least the third user device respectively during the third plurality of network requests.

15. The method of claim 1, wherein restricting the function of the second user device comprises at least one of disabling the particular application, disabling another application, or initiating a screen lock on the second user device.

16. The method of claim 1, further comprising incrementing a counter based on the determining of the particular application operating in the foreground on the second user device, wherein restricting the function of the second user device comprises disabling at least one of an application or a functional component of the second user device based on the counter crossing a particular threshold.

17. The method of claim 1, further comprising:

incrementing a counter based on the determining of the particular application operating in the foreground on the second user device; and transmitting an alert based on the counter crossing a particular threshold.

18. The method of claim 1, further comprising:

monitoring a third plurality of network requests from at least a third user device executing the second operating system wherein:

the monitoring of the first plurality of network requests from the at least the first user device comprises collecting uniform resource locators ("URLs") of the at least the first user device;

the monitoring of the third plurality of network requests from the at least the third user device comprises collecting uniform resource locators ("URLs") of the at least the third user device; and training the at least one model based on the URLs of the at least the first user device and the URLs of the at least the third user device.

19. The method of claim 1, further comprising:

monitoring a third plurality of network requests from at least a third user device executing the second operating system wherein:

the monitoring of the first plurality of network requests from the at least the first user device comprises collecting uniform resource locators ("URLs") of DNS requests of the at least the first user device;

the monitoring of the third plurality of network requests from the at least the third user device comprises collecting URLs of DNS requests of the at least the third user device; and comparing the URLs of the DNS requests of the at least the first user device and the URLs of the DNS requests of the at least the third user device to determine matching DNS requests on the at least the third user device;

determining particular URLs of particular DNS requests near in time to the matching DNS requests on the at least the third user device; and training the at least one model further based on the particular URLs.

20. The method of claim 1, further comprising:

applying the at least one model to a third plurality of network requests from a third user device to determine the particular application operating in the foreground on the third user device; and restricting the function of the second user device and a function of the third user device based on the determining of the particular application operating in the foreground on the second user device and based on the determining of the particular application operating in the foreground on the third user device.

21. The method of claim 1, wherein:

the training of the at least one model based on the first plurality of network requests comprises providing vector representations of first network traffic as first inputs to the at least one model; and the applying of the at least one model to the second plurality of network requests from the second user device comprises providing vector representations of second network traffic as second inputs to the at least one model.

22. A method of controlling use of network-connectable devices, the method comprising:

monitoring a first plurality of domain name system ("DNS") requests from at least a first user device executing a first operating system, the first plurality of DNS requests comprising a first plurality of uniform resource locators ("URLs");

monitoring a plurality of applications operating in the foreground on the at least the first user device respectively during the first plurality of DNS requests;

training at least one model based on the first plurality of URLs and the plurality of applications operating in the foreground on the at least the first user device respectively during the first plurality of DNS requests;

monitoring a second plurality of DNS requests from a second user device executing a second operating system, the second plurality of DNS requests comprising a second plurality of URLs;

applying the at least one model to the second plurality of URLs from the second user device to determine a particular application operating in the foreground on the second user device; and at least one of restricting a function of the second user device, transmitting an alert, or transmitting a report at least based on the determining of the particular application operating in the foreground on the second user device.

23. The method of claim 22, further comprising transmitting at least one of the alert or the report via a network to a third user device.

* * * * *